United States Patent Office 3,101,287
Patented Aug. 20, 1963

3,101,287
CONDITIONING TREATMENT FOR METAL SURFACES
Leo P. Curtin, Cranbury, N.J.; Leo V. Curtin, executor of said Leo P. Curtin, deceased
No Drawing. Filed Jan. 3, 1961, Ser. No. 80,048
1 Claim. (Cl. 148—6.16)

The present invention relates to conditioning treatment for metal surfaces and it comprises a method of preparing the surfaces of metals from copper to magnesium in the electromotive series for the application of corrosion-inhibiting and bonding coats, said bonding coats comprising the chromic hydroxide, chromic hydroxide-phosphate, di- and trivalent metal chromite and di- and trivalent metal chromite-phosphate types, the conditioning treatment consisting essentially of wetting the metal surface with a dilute solution of phosphoric acid, hot or cold, said solution also containing a compound comprising, in the molecule, an open-chain hydrocarbon radical of about 7 to about 21 carbon atoms and a polyoxyethylene chain of at least two oxyethylene groups, the time of treatment of the metal surface with said solution being from about 5 seconds to about 1 minute, the time varying with the metal, the temperature and the concentration of the phosphoric acid, then, without rinsing, wetting the metal surface with the bonding coat solution; all as is hereinafter more fully set forth and as claimed.

All of the bonding coat solutions referred to herein contain hexavalent chromium compounds as the chief component, such materials being reduced largely or entirely to the trivalent form in the heating step which brings about coating formation.

The chief object of the process is to deliver the metal surface to the bonding coat solution in such condition that perfect wetting by the latter solution will take place with formation of a perfect bonding coat.

The concentration of the phosphoric acid in the conditioning solution may vary from about 0.50 to about 5.0 percent, or even much higher, depending upon the metal to be processed and the temperature of the solution. The concentration of the polyoxyethylene compound advantageously may be from about 0.02 percent to about 0.10 percent. As disclosed in my co-pending application, Serial Number 21,060, April 8, 1960, now abandoned, the latter type of substance is destroyed by means of oxidation by hexavalent chromium during the drying operation, becoming converted into insoluble compounds which are useful components of the bonding coat.

While the present application does not cover the production of the bonding coats referred to above, it might be mentioned that such coatings are described in my U.S. Patents 2,846,342 and 2,901,385. By way of illustration, Example 1 from the latter numbered patent is given herewith.

| | Parts |
| --- | --- |
| Zinc bichromate | 2.8 |
| Magnesium dihydrogen phosphate | 0.4 |
| Phosphoric acid, 100% basis | 0.1 |
| Hydroxyacetic acid | 0.8 |
| Water | 95.9 |

The metal to be coated is wetted with the solution of Example 1 at the ordinary temperature, usually, and, during the drying of the metal at an elevated temperature, the hexavalent chromium is reduced to the trivalent form by the reducing agent present, hydroxyacetic acid, with production of an adherent bonding coat consisting essentially of trivalent chromium compounds with a lesser amount of phosphoric acid compounds.

It will be observed that phosphate, or phosphoric acid, is a component of the bonding coat solution, therefore, a carryover of such material from the conditioning solution is not objectionable since it will be consumed in coating formation. If desired, the bonding coat solution formula may be slightly modified to compensate for such carryover of phosphate. Likewise, the above described organic compounds in the conditioning solution are compatible with the bonding coat solution since, after oxidation, they become useful components of the bonding coat. Their presence in the conditioning solution greatly improves the action of the phosphoric acid in the production of a surface which may be perfectly wetted by the hexavalent chromium bonding coat solution.

The organic compounds of the present invention which contain a $C_7$ to $C_{21}$ open-chain hydrocarbon radical and a polyoxyethylene chain are varied in nature and can be numbered by the hundreds. By way of illustration, some of the more important are now given, the open-chain hydrocarbon radical being represented by "R."

(A) 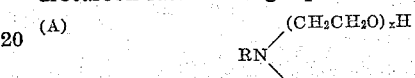

this being an N-substituted amine.

(B) 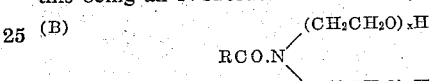

this being an N-substituted amide.

(C) 

this being an ether.

(D) 

this being an ester.

(E) 

this being an ether of an alkyl-substituted phenol.

The value of $x$, or $x$ plus $y$, need not be more than 15 or 16. It is possible, however, to use compounds where such values are 50 or more.

Substances containing sulfate or sulfonate are less desirable as components of the conditioning solution than the oxyethylene compounds above described as they may oxidize to soluble sulfates or free sulfuric acid, all such materials being highly objectionable in a bonding coat. Also, they may fail to oxidize which is equally objectionable.

In carrying out the process of the present invention, there is often some attack on the metal surface by the phosphoric acid, evidenced by some evolution of hydrogen gas. In other cases, equally good results are obtained with no evolution of hydrogen.

It is probable that the process has its greatest use in the preparation of aluminum, or aluminum alloy, surfaces to be given a bonding coat of the chromic hydroxide or chromite type. An aluminum surface absorbs gases, especially oxygen, with great avidity and this fact makes it difficult to prepare aluminum surfaces so that they will not show water-breaks when it is attempted to wet them with a hexavalent chromium solution. When the aluminum surface is prepared by the present method, perfect results are invariably obtained.

While phosphoric acid is the preferred material, it may be replaced partly or wholly by ammonium dihydrogen phosphate, or by the dihydrogen phosphates of the di- and trivalent metals at least as high as iron in the electromotive series. Such equivalents, while producing good results, usually act more sluggishly than free orthophosphoric acid. Good results are obtained with mixtures of phosphoric acid and the dihydrogen phosphates above mentioned. As already indicated, the polyoxyethylene compounds above described have hundreds of equivalents.

Following are given a number of examples which are also specific embodiments of the invention.

EXAMPLE 1

Metal Processed, Aluminum Sheet

The metal surface was first cleaned by spraying for 30 second with a 2 percent solution of a mild soap at 75° C. After rinsing with hot water, the sheet, now clean but covered with water-breaks, was sprayed with a conditioning solution for 20 second at 70° C. The conditioning solution was an aqueous solution of 1.5 percent phosphoric acid and 0.05 percent of a hydrogenated tallow acid amide carrying 15 oxyethylene groups on the N atom. Then, without rinsing, the sheet is wetted by spraying with the zinc bichromate solution above shown and, again without rinsing, dried for 10 minutes at 140° C., drying and bonding coat formation taking place concurrently. The high polish of the sheet was not appreciably impaired by the conditioning treatment.

EXAMPLE 2

Metal Processed, Aluminum-Zinc Die-Casting Containing 9 Percent Zinc

This was the procedure of Example 1 except that the amide was replaced by dodecylamine carrying 5 oxyethylene groups on the N atom.

EXAMPLE 3

Metal Processed, Elektron Metal, a Magnesium Alloy of German Origin

The metal was cleaned as in Example 1, then given a hot water rinse, then immersed in the aqueous conditioning solution for 5 minutes at 20° C. The latter consisted of 0.5 percent phosphoric acid, 2.0 percent of ammonium dihydrogen phosphate and 0.10 percent of n-dodecyl alcohol etherified with a polyoxyethylene chain containing 15 oxyethylene groups. Then, without rinsing, the metal was wetted by immersion with a bichromate bonding coat solution.

EXAMPLE 4

Metal Processed, Sheet Steel

The metal was cleaned by spraying for 1 minute with an aqueous solution of 2.0 percent sodium metasilicate, anhydrous, and 0.5 percent of sodium dodecyl benzene sulfonate at 90° C., then rinsed with hot water.

It was then sprayed for 15 seconds at 65° C. with the conditioning solution of Example 1, then, without rinsing, was spray-wetted with a bichromate bonding coat solution.

EXAMPLE 5

Metal Processed, Sheet Zinc

The metal was cleaned as in Example 1 and then sprayed with an aqueous conditioning solution consisting of 0.3 percent of phosphoric acid and 2.5 percent of calcium dihydrogen phosphate together with 0.04 percent of lauric acid esterifield with a polyoxyethylene chain containing 16 carbon atoms, the temperature being 50° C. and the time 5 seconds, after which, without rinsing, the metal is spray-wetted with a bichromate bonding coat solution.

EXAMPLE 6

Metal Processed, Sheet Copper

The metal was cleaned with a 2 percent soap solution containing 1 percent of ammonium hydroxide by spraying for 1 minute at 60° C., then, after a hot water rinse, immersed in a 10 percent aqueous solution of phosphoric acid containing 0.2 percent of ferric dihydrogen phosphate and 0.05 percent of nonylphenol etherified with a polyoxyethylene chain of 20 oxyethylene groups, the temperature being 20° C. and the time 1 minute, then, without rinsing, the metal was spray-wetted with a bichromate bonding coat solution.

EXAMPLE 7

Metal Processed, Brass Containing 30 Percent Zn

The cleaning procedure was that of Example 6 and the conditioning solution and procedure that of Example 1.

In all of the foregoing examples, as a result of the conditioning procedure, a perfectly continuous bonding coat was obtained in all cases. In Example 1, a parallel test was made on aluminum sheet treated identically except for the omission of the conditioning procedure. Here, more than 80 percent of the aluminum sheet carried no bonding coat because of the inability of the bichromate solution to wet the metal. Other applications will be obvious.

What I claim is:

A process for the application of bonding coats of the trivalent chromium type to a metal selected from the class consisting of magnesium, aluminum, zinc, ferrous metals and their alloys which comprises the following sequence of steps: (1) cleaning the surface of the metal with a hot, alkaline solution followed by a water rinse, (2) wetting the metal surface with an aqueous conditioning solution at a temperature of from about 20° C. to about 95° C. for a time from about one-quarter minute to about five minutes, said conditioning solution consisting essentially of from about 0.3 percent to about 10.0 percent of an orthophosphoric acid compound selected from the class consisting of dihydrogen phosphates of di- and trivalent metals at least as high as iron in the electromotive series, ammonium dihydrogen phosphate and free phosphoric acid and from about 0.02 percent to about 0.10 percent of a compound comprising in the molecule an open-chain hydrocarbon radical of from about 7 to about 21 carbon atoms and a polyoxyethylene chain of at least 2 oxyethylene groups, (3) without rinsing off the conditioning solution, wetting the metal surface with a hexavalent chromium bonding coat solution containing a reducing agent for said hexavalent chromium, and (4) heating the metal carrying a film of bonding coat solution on its surface to a temperature above 100° C. to bring about drying and reduction of the hexavalent chromium with formation of the trivalent chromium bonding coat.

References Cited in the file of this patent

UNITED STATES PATENTS

| | | |
|---|---|---|
| 2,403,426 | Douty et al. | July 2, 1946 |
| 2,516,685 | Douty et al. | July 25, 1950 |
| 2,777,785 | Schuster et al. | Jan. 15, 1957 |
| 2,800,422 | Piccinelli | July 23, 1957 |
| 2,809,906 | Baecker et al. | Oct. 15, 1957 |
| 2,846,342 | Curtin | Aug. 2, 1958 |
| 2,886,477 | Smith | May 12, 1959 |
| 2,891,884 | Rausch et al. | June 23, 1959 |
| 2,901,385 | Curtin | Aug. 25, 1959 |
| 2,935,432 | Schuster et al. | May 3, 1960 |

FOREIGN PATENTS

| | | |
|---|---|---|
| 1,062,140 | France | Dec. 2, 1953 |